United States Patent
Gummaraju et al.

(10) Patent No.: US 10,977,063 B2
(45) Date of Patent: Apr. 13, 2021

(54) ELASTIC COMPUTE FABRIC USING VIRTUAL MACHINE TEMPLATES

(71) Applicant: VMware, Inc., Palo Alto, CA (US)

(72) Inventors: Jayanth Gummaraju, San Francisco, CA (US); Gabriel Tarasuk-Levin, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 547 days.

(21) Appl. No.: 14/136,621

(22) Filed: Dec. 20, 2013

(65) Prior Publication Data

US 2015/0178107 A1    Jun. 25, 2015

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01); *G06F 2009/45575* (2013.01)

(58) Field of Classification Search
CPC ....... G06F 9/45558; G06F 2009/45562; G06F 2009/45575; G06F 2009/4557
See application file for complete search history.

(56) References Cited

U.S. PATENT DOCUMENTS

| | | | |
|---|---|---|---|
| 6,278,448 B1 | 8/2001 | Brown et al. | |
| 6,795,966 B1 | 9/2004 | Lim et al. | |
| 7,313,793 B2 | 12/2007 | Traut et al. | |
| 7,484,208 B1 | 1/2009 | Nelson | |
| 7,657,888 B2 | 2/2010 | Traut et al. | |
| 7,680,919 B2 | 3/2010 | Nelson | |
| 7,725,531 B1 | 5/2010 | Sood et al. | |
| 7,971,015 B2 | 6/2011 | Waldspurger et al. | |
| 8,015,563 B2 | 9/2011 | Araujo et al. | |
| 8,151,263 B1 | 4/2012 | Venkitachalam et al. | |
| 8,239,633 B2 | 8/2012 | Wood | |
| 8,260,904 B2 | 9/2012 | Nelson | |

(Continued)

FOREIGN PATENT DOCUMENTS

GB    2483300    3/2012

OTHER PUBLICATIONS

USPTO, "Non-final Office Action in U.S. Appl. No. 14/136,701", dated Jun. 18, 2015, 10 pages.

(Continued)

*Primary Examiner* — Theodore C Parsons
*Assistant Examiner* — Bruce S Ashley
(74) *Attorney, Agent, or Firm* — Thomas | Horstemeyer LLP

(57) ABSTRACT

Embodiments include an infrastructure shared among cloud services that supports fast provisioning of virtual machines (VMs). A set of powered-on parent VM templates and a set of powered-off child VMs are maintained by the infrastructure in a hierarchy. The child VMs are instantiated from the parent VM templates, and pre-registered to a cloud operating system in some embodiments. In response to requests from the cloud services for the child VMs, where the requests specify child VM configurations, child VMs from the set of powered-off child VMs are selected and customized based on the child VM configurations, and then deployed for use by the cloud services. In some embodiments, the fast provisioning of VMs is supported by forking operations in the infrastructure.

20 Claims, 12 Drawing Sheets

(56) References Cited

U.S. PATENT DOCUMENTS

| | | | |
|---|---|---|---|
| 8,285,808 | B1 | 10/2012 | Joel et al. |
| 8,307,187 | B2 | 11/2012 | Chawla et al. |
| 8,359,594 | B1 | 1/2013 | Davidson et al. |
| 8,413,146 | B1 | 4/2013 | McCorkendale et al. |
| 8,464,252 | B2 | 6/2013 | Schneider |
| 8,499,191 | B2 | 7/2013 | Shimada |
| 8,555,274 | B1 | 10/2013 | Chawla |
| 8,631,066 | B2 | 1/2014 | Lim |
| 8,635,395 | B2 | 1/2014 | Colbert |
| 8,635,695 | B2 | 1/2014 | Zuk et al. |
| 8,639,783 | B1 | 1/2014 | Bakke et al. |
| 8,656,386 | B1 | 2/2014 | Baimetov et al. |
| 8,732,698 | B2 | 5/2014 | Ling et al. |
| 8,762,547 | B2 | 6/2014 | Stanev |
| 8,793,427 | B2 | 7/2014 | Lim et al. |
| 8,793,684 | B2 | 7/2014 | Breitgand et al. |
| 8,806,266 | B1 | 8/2014 | Qu et al. |
| 8,898,668 | B1 | 11/2014 | Costea et al. |
| 8,904,081 | B1 | 12/2014 | Kulkarni |
| 9,081,686 | B2 | 7/2015 | Beveridge et al. |
| 9,098,322 | B2 * | 8/2015 | Apte ..................... G06F 8/65 |
| 9,170,835 | B2 | 10/2015 | Ling et al. |
| 9,213,513 | B2 | 12/2015 | Hartz et al. |
| 9,292,327 | B1 | 3/2016 | Von et al. |
| 9,311,375 | B1 | 4/2016 | Naik |
| 9,323,565 | B2 | 4/2016 | Li et al. |
| 9,442,752 | B1 | 9/2016 | Roth et al. |
| 9,513,949 | B2 | 12/2016 | Beveridge |
| 9,619,268 | B2 | 4/2017 | Beveridge et al. |
| 2004/0010787 | A1 * | 1/2004 | Traut ................ G06F 9/45537 718/1 |
| 2004/0221290 | A1 | 11/2004 | Casey et al. |
| 2006/0101189 | A1 | 5/2006 | Chandrasekaran et al. |
| 2006/0129627 | A1 | 6/2006 | Phillips et al. |
| 2006/0227585 | A1 | 10/2006 | Tomoda |
| 2007/0074208 | A1 * | 3/2007 | Ling .................. G06F 9/45558 718/1 |
| 2007/0204121 | A1 | 8/2007 | O'Connor et al. |
| 2008/0134175 | A1 * | 6/2008 | Fitzgerald ........... G06F 9/45533 718/1 |
| 2008/0134177 | A1 * | 6/2008 | Fitzgerald ............... G06F 21/51 718/1 |
| 2008/0155223 | A1 | 6/2008 | Hiltgen et al. |
| 2008/0163210 | A1 | 7/2008 | Bowman et al. |
| 2008/0184225 | A1 | 7/2008 | Fitzgerald et al. |
| 2008/0244028 | A1 | 10/2008 | Le et al. |
| 2009/0007106 | A1 | 1/2009 | Araujo, Jr. |
| 2009/0037680 | A1 | 2/2009 | Colbert et al. |
| 2009/0113109 | A1 | 4/2009 | Nelson |
| 2009/0125882 | A1 | 5/2009 | Frigo et al. |
| 2009/0204718 | A1 | 8/2009 | Lawton et al. |
| 2009/0282101 | A1 | 11/2009 | Lim et al. |
| 2009/0282404 | A1 | 11/2009 | Khandekar |
| 2009/0307441 | A1 | 12/2009 | Hepkin et al. |
| 2010/0011178 | A1 | 1/2010 | Feathergill |
| 2010/0023942 | A1 | 1/2010 | Sheu et al. |
| 2010/0070978 | A1 | 3/2010 | Chawla et al. |
| 2010/0186011 | A1 | 7/2010 | Magenheimer |
| 2010/0257523 | A1 | 10/2010 | Frank |
| 2010/0257524 | A1 | 10/2010 | Weissman et al. |
| 2010/0332643 | A1 | 12/2010 | Benari |
| 2010/0332722 | A1 | 12/2010 | Oiwa et al. |
| 2011/0066786 | A1 | 3/2011 | Colbert |
| 2011/0154331 | A1 | 6/2011 | Ciano et al. |
| 2011/0167195 | A1 | 7/2011 | Scales et al. |
| 2012/0017027 | A1 | 1/2012 | Baskakov et al. |
| 2012/0066679 | A1 | 3/2012 | Pappas et al. |
| 2012/0084517 | A1 | 4/2012 | Post et al. |
| 2012/0110574 | A1 | 5/2012 | Kumar |
| 2012/0144391 | A1 | 6/2012 | Ueda |
| 2012/0151477 | A1 | 6/2012 | Sinha |
| 2012/0159478 | A1 | 6/2012 | Spradlin et al. |
| 2012/0174096 | A1 | 7/2012 | Conover |
| 2012/0204060 | A1 | 8/2012 | Swift |
| 2012/0216185 | A1 | 8/2012 | Dai et al. |
| 2012/0240110 | A1 | 9/2012 | Breitgand et al. |
| 2012/0246645 | A1 | 9/2012 | Iikura et al. |
| 2012/0254889 | A1 | 10/2012 | Demkowicz et al. |
| 2012/0265959 | A1 | 10/2012 | Le et al. |
| 2012/0272236 | A1 | 10/2012 | Baron et al. |
| 2012/0324446 | A1 | 12/2012 | Fries et al. |
| 2012/0331465 | A1 | 12/2012 | Tanikawa |
| 2013/0047160 | A1 | 2/2013 | Conover |
| 2013/0067289 | A1 | 3/2013 | Maislos et al. |
| 2013/0097377 | A1 | 4/2013 | Satoyama |
| 2013/0111474 | A1 | 5/2013 | Agarwal et al. |
| 2013/0174096 | A1 | 7/2013 | Lewin |
| 2013/0198745 | A1 * | 8/2013 | De ...................... G06F 9/45533 718/1 |
| 2013/0246355 | A1 | 9/2013 | Nelson |
| 2013/0254383 | A1 | 9/2013 | Wray |
| 2013/0263119 | A1 | 10/2013 | Pissay et al. |
| 2013/0282792 | A1 | 10/2013 | Graham |
| 2013/0332610 | A1 | 12/2013 | Beveridge |
| 2013/0332920 | A1 * | 12/2013 | Laor .................. G06F 9/45558 718/1 |
| 2014/0040887 | A1 | 2/2014 | Morariu |
| 2014/0047193 | A1 | 2/2014 | Gross et al. |
| 2014/0068181 | A1 | 3/2014 | Mridha et al. |
| 2014/0075127 | A1 | 3/2014 | Garthwaite |
| 2014/0115228 | A1 | 4/2014 | Zhou et al. |
| 2014/0130040 | A1 | 5/2014 | Lemanski |
| 2014/0137112 | A1 | 5/2014 | Rigolet |
| 2014/0156910 | A1 | 6/2014 | Uttamchandani et al. |
| 2014/0164718 | A1 | 6/2014 | Van et al. |
| 2014/0164723 | A1 | 6/2014 | Garthwaite et al. |
| 2014/0173181 | A1 | 6/2014 | Beveridge et al. |
| 2014/0173196 | A1 | 6/2014 | Beveridge |
| 2014/0173213 | A1 | 6/2014 | Beveridge |
| 2014/0215172 | A1 | 7/2014 | Tsirkin |
| 2014/0244950 | A1 | 8/2014 | Baron et al. |
| 2014/0245294 | A1 | 8/2014 | Kaul |
| 2014/0330948 | A1 | 11/2014 | Dunn et al. |
| 2014/0366019 | A1 | 12/2014 | Bajaj |
| 2015/0046925 | A1 | 2/2015 | Costea et al. |
| 2015/0058580 | A1 | 2/2015 | Lagar Cavilla et al. |
| 2015/0058837 | A1 | 2/2015 | Govindankutty |
| 2015/0067390 | A1 | 3/2015 | Blake |
| 2015/0089496 | A1 | 3/2015 | Thankappan |
| 2015/0178108 | A1 | 5/2015 | Tarasuk-Levin |
| 2015/0178110 | A1 | 5/2015 | Li et al. |
| 2016/0055016 | A1 | 2/2016 | Beveridge |
| 2016/0055021 | A1 | 2/2016 | Beveridge et al. |
| 2016/0170788 | A1 | 6/2016 | Tarasuk-Levin et al. |
| 2017/0192814 | A1 | 7/2017 | Beveridge et al. |

OTHER PUBLICATIONS

Wang et al., "Rethink the Virtual Machine Template", published 2011, 11 pages.

Vrable, M. et al. "Scalability, fidelity, and containment in the Potemkin virtual honeyfarm", ACM SIGOPS Operating Systems Review, Published Oct. 20, 2005, Retrieved from the Internet: URL:<http://portal.acm.org/citation.cfm?id=I095825>, 15 pages.

Shi et al., "A Cloud Service Cache System Based on Memory Template of Virtual Machine", published 2011, 6 pages.

Bryant et al., "Kaleidoscope: Cloud Micro-Elasticity via VM State Coloring", published 2011, 14 pages.

"Non-Final Office Action", U.S. Appl. No. 14/136,661, dated Mar. 3, 2016, 2 pages.

"International Search Report and Written Opinion", International Patent Application No. PCT/US2015/046177, dated Oct. 30, 2015, 11 pages.

Liu, H. et al. Live Virtual Machine 1-20 Migration via Asynchronous Replication and State Synchronization, IEEE Transactions on Parallel and Distributed Systems, vol. 22, No. 12, Los Alamitos, CA, Published Dec. 1, 2011, 14 pages.

"International Search Report and Written Opinion", International Patent Application No. PCT/US2015/046178, dated Oct. 26, 2015, 11 pages.

Unknown, "Atlantis ILIO in XenApp Environments, 1-20 1", Published Aprill 2014. Retrieved on Oct. 15, 2015, Retrieved from

(56) References Cited

OTHER PUBLICATIONS the Internet: URL:<http://web.archive.org/web/20 140701144808/ http://atlantiscomputing.com/downloads/WPAtl antisiLIOinXenAp-pEnvironnnents20140424.pdf >, 2 pages.
Unknown, "Atlantis ILIO Diskless VDI for VMware View", Published Jan. 24, 2014, Retrieved Oct. 15, 2015, Retrieved from the Internet: URL:<http://web.archive.org/web/20140124082015/http://www.atlantiscomputing.com/downloads/DisklessVDI Solution BriefVMWare.pdf>, 2 pages.
"Non-Final Office Action", U.S. Appl. No. 13/764,405, dated Mar. 26, 2015, 23 pages.
"Non-Final Office Action", U.S. Appl. No. 13/764,516, dated Mar. 27, 2015, 21 pages.
Beveridge et al., "Rapid Suspend/Resume for Virtual Machines via Resource Sharing", U.S. Appl. No. 14/615,353, filed Feb. 5, 2015, 44 pages.
Mills, Paul V., "Office Action", U.S. Appl. No. 14/136,661, dated Jun. 16, 2016, 17 pages.
Unknown, "Project Serengeti", accessed at <<http://www.projectserengeti.org>>, accessed on Dec. 19, 2013, 2 pages.
Unknown, "Welcome to Apache Hadoop!", accessed at <<http://hadoop.apache.org>>, Dec. 12, 2013, 4 pages.
Unknown, "Horizon View", accessed at <<http://www.vmware.com/products/horizon-view>>, accessed on Dec. 19, 2013, 6 pages.
Unknown, "Cloud Foundry Community", accessed at <<http://www.cloudfoundry.org>>, accessed on Dec. 19, 2013, 2 pages.
Lagar-Cavilla et al., "SnowFlock: Virtual Machine Cloning as a First Class Cloud Primitive", ACM Transactions on Computing Systems., vol. 29(1), Feb. 2011, 50 pages.
Unknown, "What's new in private Paas? Introducing OpenShift Enterprise 2.0", accessed at <<http://www.redhat.com/about/events-webinars/webinars/2013-12-17-openshift-enterprise-2>>, accessed on Dec. 19, 2013, 1 page.
Unknown, "OpenShift Platform Features", Benefits Document, Red Hat, Inc., 2012, 5 pages.
Unknown, "SnowFlock: Swift VM Cloning for Cloud Computing", accessed at <<http://sysweb.cs.toronto.edu/snowflock>>, accessed on Dec. 19, 2013, 2 pages.
Unknown, "Virtual Memory Streaming", OpenStack, Gridcentric, Inc., 2013, 2 pages.
Unknown, "RemoteApp for Hyper-V", Remote Desktop Services Blog, accessed at <<http://blog.msdn.com/b/rds/archive/2009/12/15/remoteapp-for-hyper-v.aspx>>, Dec. 2009, 5 pages.
Unknown, "LXC", accessed at <<http://en.wikipedia.org/wiki/LXC>>, accessed on Dec. 19, 2013, 2 pages.
Unknown, "Linux-VServer", accessed at <<http://en.wikipedia.org/wiki/Linux-VServer>>, accessed on Dec. 19, 2013, 3 pages.
USPTO, "Notice of Allowance and Fees Due in U.S. Appl. No. 14/136,701", dated Dec. 18, 2015, 13 pages.
USPTO, "Non-final Office Action in U.S. Appl. No. 14/136,741", dated Dec. 3, 2015, 9 pages.
USPTO, Non-final Office Action in U.S. Appl. No. 14/615,366, dated Nov. 20, 2015, 10 pages.
Surendra, Anne, "Linux Booting Process Explained", http://www.linuxnix.com/linux-booting-process-explained/, Apr. 5, 2013, 4 pages.
Office Action dated for U.S. Appl. No. 14/136,661.
Office Action dated for U.S. Appl. No. 15/091,003.
Deng et al., "Fast Saving and Restoring Virtual Machines with Page Compression," 2011 International Conference on Cloud and Service Computing, IEEE 2011, pp. 150-157.
Morin, Christine and Puaut, Isabelle, "A Survey of Recoverable Distributed Shared Virtual Memory Systems," IEEE Transactions on Parallel and Distributed Systems, vol. 8, No. 9, Sep. 1997.
R. Singh and P. Graham, "Performance Driven Partial Checkpoint/Migrate fo r LAM-MPI," 2008 22nd International Symposium on High Performance Computing Systems and Applications, Quebec Citv, Que., 2008, DD. 110-116. (Year: 2008).
S. Salmi and V. Varma, "A Hybrid Approach to Live Migration of Virtual Machines," 2012 IEEE International Conference on Cloud Computing in Emerging Markets (CCEM), Bangalore, 2012, pp. 1-5. (Year: 2012).
Yu et al., "A Feather-weight Virtual Machine for Windows Applications," ACM, VEE '06, Jun. 14-16 2006.
Yun et al., "Providing Extra Memory for Virtual Machines by Sharing Compressed Swap Pages," 2015 IEEE International Conference on Consumer Electronics, 2014, pp. 430-431.
Murphy, Daniel L. "Storage organization and management in TENEX." Proceedings of the Dec. 5-7, 1972, fall joint computer conference, part I. 1972.
Copy-on-write Definition from Computer Hope Retrieved from: www.computerhope.com/jargon/c/copy-on-write.htm (Year: 2019).
Frisch, Aeleen. "Essential system administration" O'Reilly Media, Inc., 2002 pp. 127-168.

* cited by examiner

ELASTIC COMPUTE FABRIC USING VIRTUAL MACHINE TEMPLATES

CROSS-REFERENCE TO RELATED APPLICATIONS

This application is related to U.S. patent applications entitled "Fast Instantiation of Virtual Machines", "State Customization of Forked Virtual Machines", and "Provisioning Customized Virtual Machines Without Rebooting", filed concurrently herewith, all of which are incorporated by reference herein in their entireties.

BACKGROUND

Some cloud services require many virtual machines (VMs) to efficiently support multiple tenants and/or multiple concurrent jobs. Examples include cloud services that manage very large datasets such as vHadoop from VMware, Inc., virtual desktop services such as Virtual Desktop Infrastructure (VDI) from VMware, Inc., and cloud service providers such as the CLOUD FOUNDRY brand computer services (e.g., MONGODB brand computer software). Each of these services, and others, requires a large pool of VMs to be created and scaled-back over time and on demand, dependent on the workload of the service. Further, the services require VM instantiation and teardown operations to be fast and highly elastic.

However, the existing operations for VM instantiation and teardown are slow and highly processor intensive. For example, it may take 20 seconds to boot one of the VMs using some existing systems. Further, each of these services has its own separate infrastructure for managing such operations, which increases the complexity of each service and leads to a performance disparity among the different services.

SUMMARY

One or more embodiments described herein dynamically scale a cloud service by increasing a quantity of virtual machines (VMs) available thereto. A set of powered-on parent VM templates and a set of powered-off child VMs instantiated from the powered-on parent VM templates are maintained. Upon receiving a request from the cloud service for at least one of the child VMs, a child VM configuration from the received request is applied to at least one of the child VMs in the set of child VMs. The child VM with the applied child VM configuration is then deployed.

In some embodiments, a compute fabric cloud service manages the set of parent VM templates and the set of child VMs by, for example, creating the parent VM templates on demand. Alternatively or in addition, one or more cloud service tenants of compute fabric cloud service manually create the parent VM templates, and perform other operations, via an application programming interface (API).

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
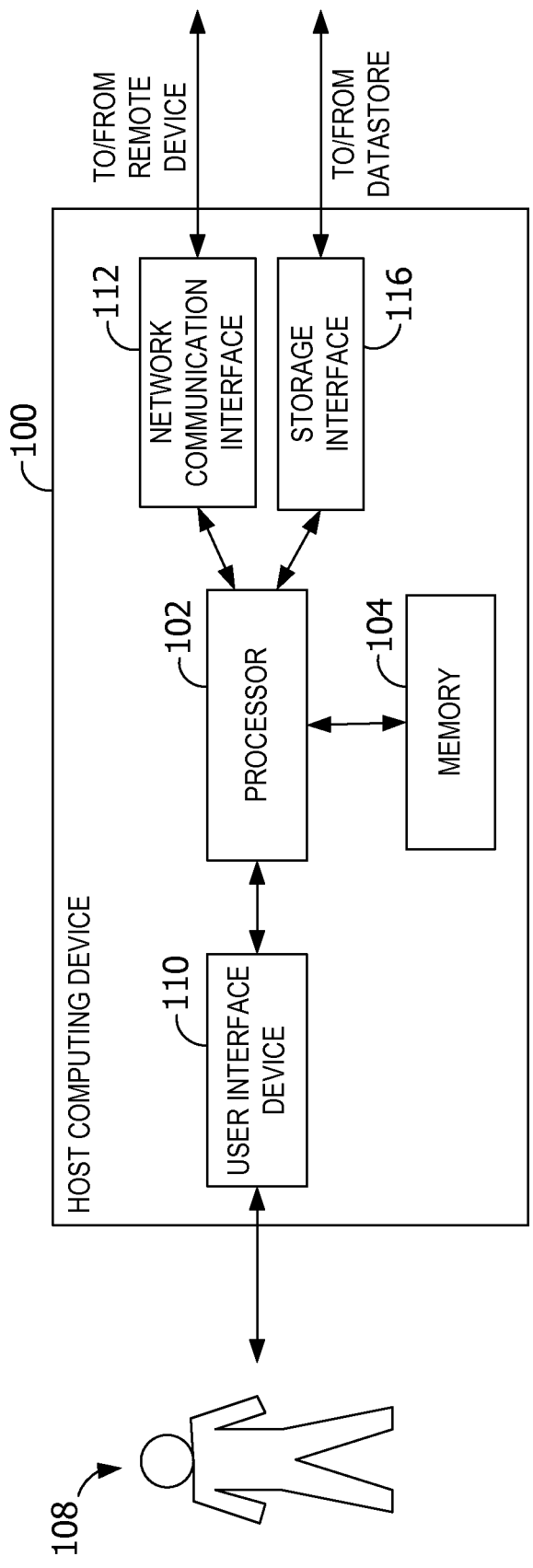
FIG. 1 is a block diagram of an exemplary host computing device.

Embodiments herein describe a shared compute fabric cloud service 402 that efficiently supports fast, elastic, and automatic provisioning of virtual machines (VMs) for multiple cloud services 302 (e.g., tenants of compute fabric cloud service 402). Some embodiments present an application programming interface (API) 404 that may be leveraged by many of cloud services 302 to quickly scale in and scale out of VMs, such as VMs 235, based on demand. In operation, cloud services 302 request resources and properties of the resources, and compute fabric cloud service 402 makes the resources available immediately, instantaneously, or otherwise faster than existing systems.

Aspects of the disclosure include a shared infrastructure (e.g., compute fabric cloud service 402) accessible via API 404 that enables quick provisioning of VMs 235 by managing a hierarchy of powered-on templates and employing fast VM instantiation operations 406 to quickly spawn VMs 235 with desired properties. Some embodiments store parent VM templates 310 in a tree hierarchy with each parent VM template 310 representing a linked clone of its parent with its memory shared via copy-on-write (COW). In such embodiments, a set of child VMs, pre-registered to a cloud operating system, is internally maintained for each template. Child VMs are created as a linked clone of the corresponding parent VM template 310. When one of cloud services 302 commissions or otherwise requests provisioning of one or more VMs 235, aspects of the disclosure create a COW share of parent VM template 310 memory to give to requesting cloud service 302.

In this manner, and as described further herein, compute fabric cloud service 402 supports the instantaneous provisioning of VMs 235 on demand, allows for memory and disk content sharing across cloud services 302 using parent VM templates 310 common to cloud services 302, and improves cloud service 302 performance by eliminating use of hot spare VMs 235.

Embodiments are operable with any cloud service 302, such as those managing very large datasets (e.g., "big data"), those supporting virtual desktops, and those providing a cloud computing platform as a service or other cloud service provider (e.g., CLOUD FOUNDRY brand computer services). In part by creating and managing parent VM templates 310 as described herein, aspects of the disclosure are able to instantly provision (e.g., about under a second) these and other cloud services 302 with fully functional VMs 235 with low (e.g., minimal) processor overhead.

An exemplary virtualized environment is next described.

FIG. 1 is a block diagram of an exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid-state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
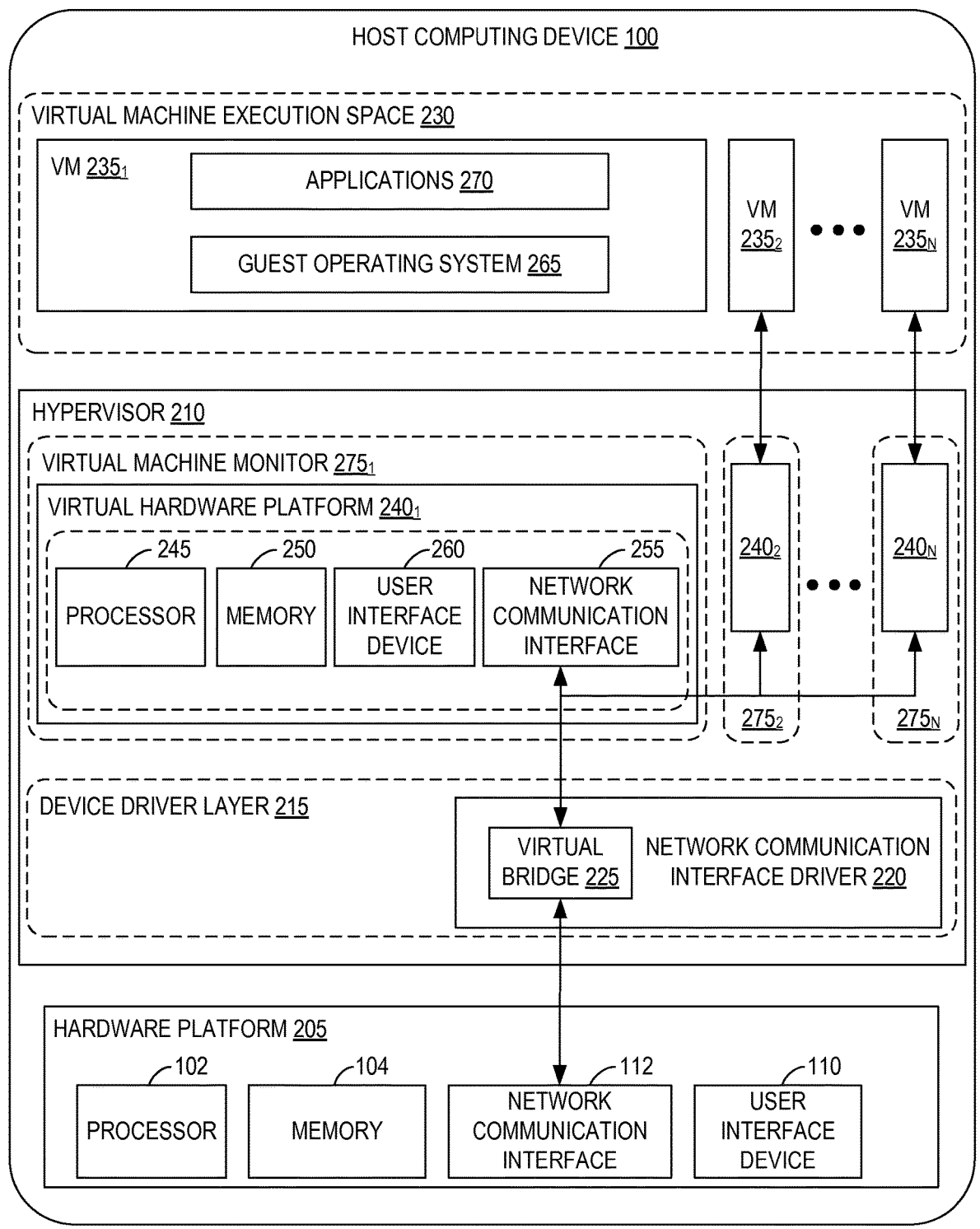
FIG. 2 is a block diagram of virtual machines (VMs) that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device (not shown). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some embodiments, memory 250 in first virtual hardware platform $240_1$ includes a virtual disk that is associated with or "mapped to" one or more virtual disk images stored on a disk (e.g., a hard disk or solid-state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such embodiments, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach VM 235 in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an embodiment of the disclosure is included as a component in VMware's ESX brand software, which is commercially available from VMware, Inc.

Figure 3:
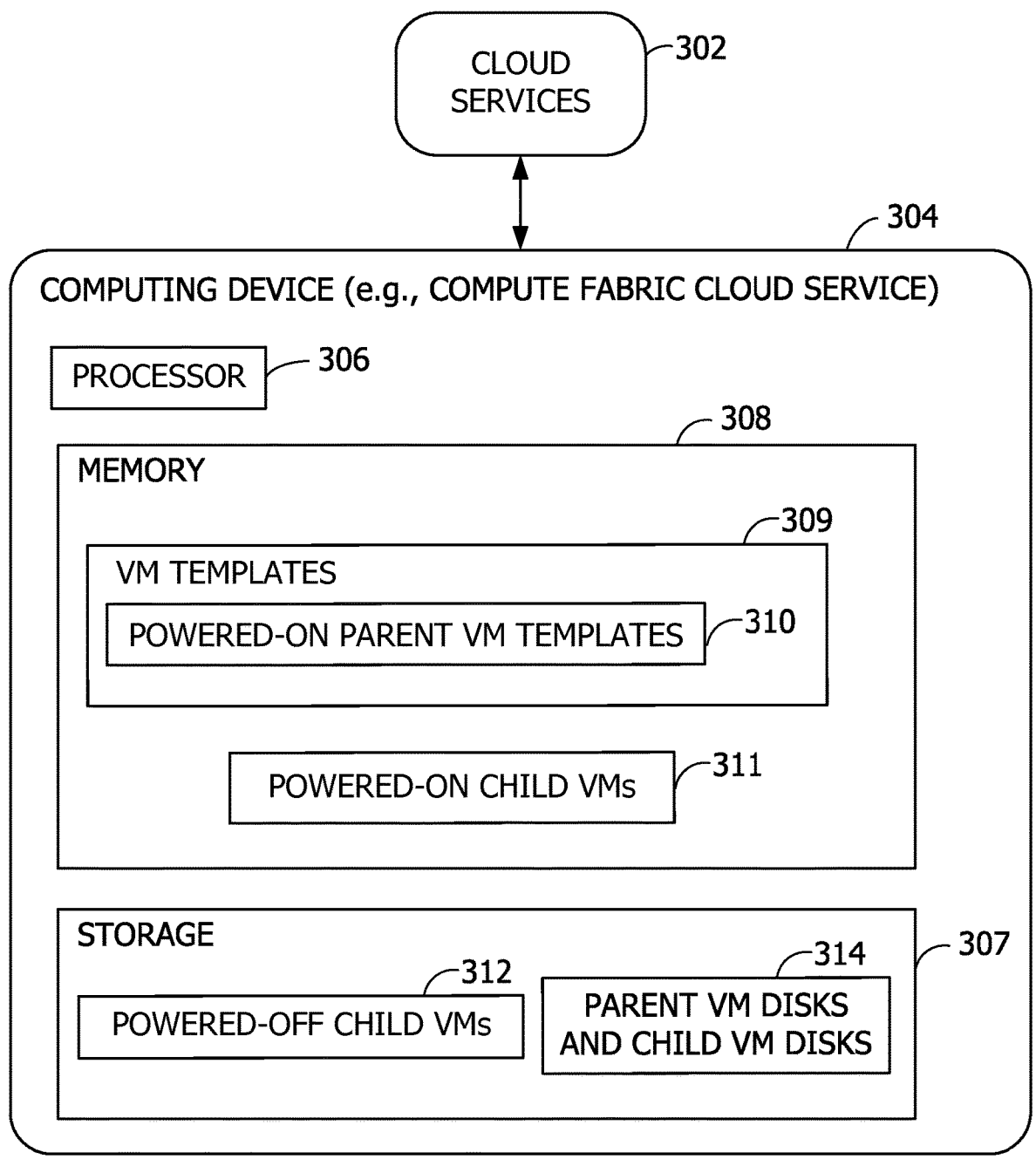
FIG. 3 is a block diagram of an exemplary computing device storing VM templates and VMs instantiated therefrom.

Referring next to FIG. 3, a block diagram illustrates an exemplary computing device 304 storing a plurality of VM templates 309 and VMs instantiated therefrom, and communicating with at least one of cloud services 302. Computing device 304 represents any device executing instructions (e.g., as application programs, operating system functionality, or both) to implement the operations and functionality described herein. For example, computing device 304 executes instructions to implement the operations illustrated in FIG. 5. Computing device 304 may include any computing device or processing unit. In some embodiments, computing device 304 may represent a group of processing units or other computing devices, such as in a cloud computing configuration. For example, computing device 304 executes a plurality of VMs 235.

Computing device 304 has at least one processor 306 and a memory 308 (e.g., a memory area). Processor 306 includes any quantity of processing units, and is programmed to execute computer-executable instructions for implementing aspects of the disclosure. The instructions may be performed by processor 306 or by multiple processors executing within computing device 304, or performed by a processor external to computing device 304. In some embodiments, processor 306 is programmed to execute instructions such as those illustrated in the figures to implement compute fabric cloud service 402.

Memory 308 includes any quantity of computer-readable media associated with or accessible by computing device 304. Memory 308, or portions thereof, may be internal to computing device 304, external to computing device 304, or both. Exemplary memory 308 includes random access memory.

In the example of FIG. 3, memory 308 stores a plurality of VM templates 309. In some embodiments, VM templates 309 are arranged in a hierarchy, such as a tree hierarchy. However, aspects of the disclosure are operable with VM templates 309 stored in any structure. In such embodiments, VM templates 309 include a plurality of powered-on parent VM templates 310. The powered-on parent VM templates 310 may be created and maintained by compute fabric cloud service 402 and/or by cloud services 302. The parent VM templates 310 may be classified, categorized, or otherwise described as derived VM templates and standalone VM templates. Derived VM templates are derived from one of parent VM templates 310, and inherit one or more disk blocks (e.g., "common" disk blocks) from that corresponding parent VM template 310. The standalone VM templates lack any such inherited disk block from parent VM templates 310. Aspects of the disclosure are operable with any form of disk block inheritance, such as via a redo log, array-level snapshots (e.g., using block reference counting), etc.

Memory 308 further stores data describing a plurality of powered-on child VMs 311.

Computing device 304 further includes storage 307. Storage 307 stores data describing a plurality of powered-off child VMs 312. Each of the powered-off child VMs 312 is instantiated, on demand, from one of the plurality of parent VM templates 310. Until then, powered-off child VMs 312 do not occupy any memory resources. For example, powered-off child VMs 312 are present in storage 307 and, when powered-on, copy-on-write (COW) share memory pages with parent VMs and enter into memory 308.

Child VMs have one or more properties, characteristics, or data associated therewith. Exemplary child VM properties include, but are not limited to, hostname, IP address, MAC address, domain identity, processor size, and/or memory size. In some embodiments, the child VM properties for each child VM (e.g., second VM) may be referred to as configuration data. Storage 307 further stores parent VM disks and child VM disks 314 (e.g., .vmdk files) for use by VMs 235.

In contrast to memory 308, exemplary storage 307 includes one or more disks.

After instantiation, powered-off child VMs 312 are registered to the cloud operating system. The cloud operating system is executed by compute fabric cloud service 402. Registration of one of powered-off child VMs 312 includes identifying powered-off child VM 312 to the cloud operating system, and occurs before powered-off child VM 312 is powered-on. In this manner, powered-off child VM 312 is said to be pre-registered with the cloud operating system. In some embodiments, the cloud operating system is hypervisor 210. By registering powered-off child VMs 312, the cloud operating system is no longer in the critical path when cloud services 302 commission VMs 235. However, aspects of the disclosure are also operable with registration occurring on the child VM instantiation path.

Figure 4:
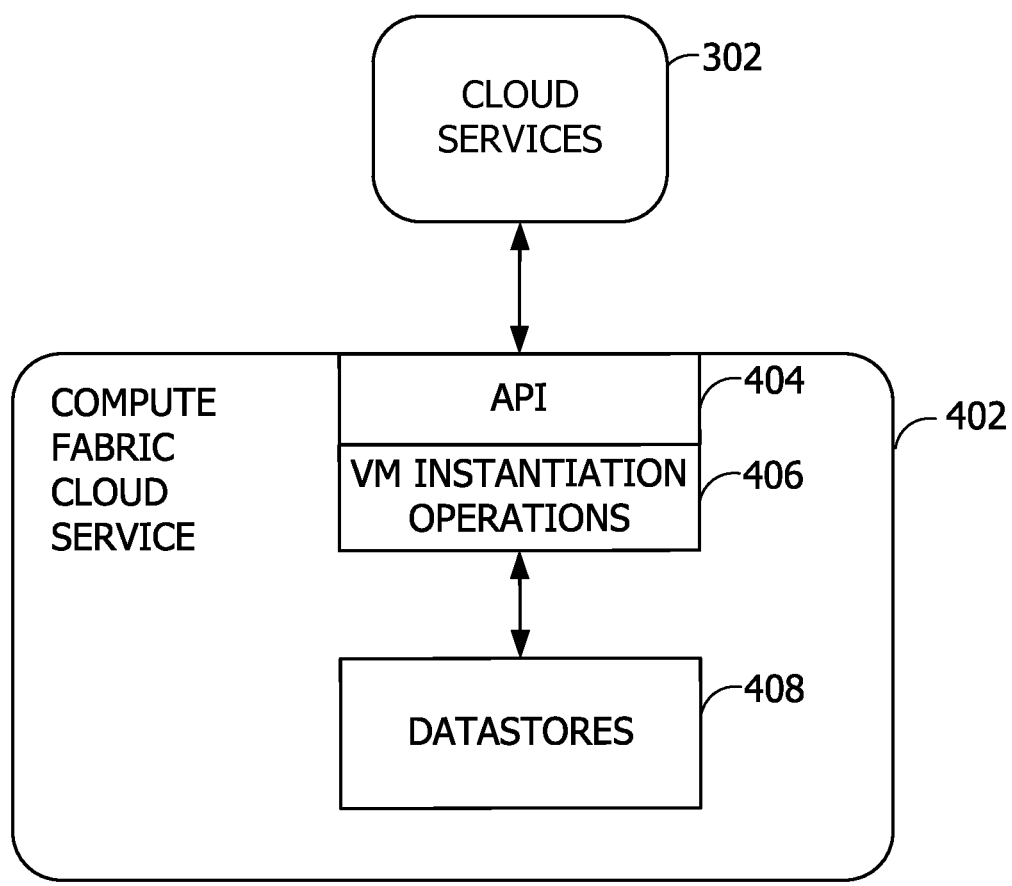
FIG. 4 is a block diagram of an exemplary compute fabric cloud service interacting with cloud services to deploy VMs.

Referring next to FIG. 4, a block diagram illustrates compute fabric cloud service 402 interacting with cloud services 302 to deploy VMs 235. In the example of FIG. 4, compute fabric cloud service 402 has API 404 accessible to cloud services 302. Cloud services 302 interact with compute fabric cloud service 402 via API 404. API 404 provides an interface to VM instantiation operations 406. Aspects of the disclosure are operable with any API for implementing the functionality described herein. An example of API 404 is described below in Table 1. However, those skilled in the art will note that additional or fewer function calls are contemplated, that additional or fewer arguments in each function call are contemplated, and that other means exist for implementing the functionality described herein and are within the scope of the disclosure.

The example of API 404 includes functions for execution during a setup phase, execution phase, and teardown phase while in a manual mode, and also supports a function call for auto mode. In manual mode, cloud service 302 is responsible for explicitly creating (and maintaining) parent VM templates 310. In automatic mode, one or more parent VM templates 310 are created implicitly based on demand. For example, in manual mode, aspects of the disclosure derive the hierarchy of parent VM templates 310 by observing popular child VM configuration requests (e.g., based on a frequency of requests for those child VM configurations).

TABLE 1

Exemplary API Function Calls.

| | Manual Mode |
|---|---|
| Setup Phase | bool createParentTemplate(vmSpecs, packages, standaloneFlag, parentTemplate) |
| | bool createChildren(parentTemplate, childProperties, numChildren, childrenVMs) |
| Execution Phase | bool powerOnChildren(childrenVMs) |
| | bool powerOffChildren(childrenVMs) |
| | bool powerResetChildren(childrenVMs) |
| Teardown Phase | bool destroyParentTemplate(parentTemplate) |
| | bool destroyChildren(childrenVMs) |
| | Automatic Mode |
| | bool createChildrenAuto(vmSpecs, packages, maxLevels, childProperties, numChildren, childrenVMs) |

During the setup phase, cloud service 302 creates one of powered-on parent VM templates 310 using the createParentTemplate( ) function call. In addition to the VM and package specifications, cloud service 302 also specifies whether to create a standalone template or a derived VM template (e.g., from another parent VM template 310). Cloud service 302 also creates a defined quantity of registered (e.g., to the cloud operating system) but powered-off child VMs 312 using the createChildren( ) function call. The createChildren( ) function call also takes as input a childProperties argument which defines, for example, the identities (e.g., hostname, IP/MAC address, etc.) and particular processor and/or memory sizes of the child VMs. If the sizes are different from that of parent VM template 310, compute fabric cloud service 402 may either add those resources when powering on the child VM (e.g., a "hot add") or create a new parent VM template 310. In addition, the childProperties argument also specifies how the created child VM behaves when powered-on and/or reset. For example, the child VM may act as an ephemeral entity that returns to the same, original parent state, or a regular VM that goes through a usual boot process.

In the execution phase, the child VMs are instantiated using the powerOnChildren( ) function call. The powerOnChildren( ) function call leverages fast VM instantiation techniques, such as those as described herein, to quickly spawn VMs 235 with minimal processor overhead. Child VMs 311 may also be powered off or reset using the powerOffChildren( ) function call and the powerResetChildren( ) function call.

In the teardown phase, parent VM templates 310 and child VMs 311 may be destroyed using the destroyParentTemplate( ) and destroyChildren( ) function calls. Depending on whether parent VM template 310 is part of the template hierarchy (e.g., a derived VM template) or a standalone template, destroying the template may not remove it completely from disk. The destroyChildren( ) function call turns off child VM 311 (e.g., power down) and resets the child VM properties such as identity, etc.

In automatic mode, rather than have parent VM templates 310 be explicitly created via the function calls available in manual mode, parent VM templates 310 are automatically generated based on demand. For example, cloud service 302 uses the createChildrenAuto( ) function call to create the child VMs. When a particular type of child VM is requested repeatedly (e.g., a plurality of requests are received for the same type of child VM), compute fabric cloud service 402 creates a new powered-on parent VM template, deriving it from the appropriate parent VM template 310 in the hierarchy. This optimization further simplifies the setup and teardown phases by eliminating the need for cloud services 302 to explicitly create, destroy, and otherwise manage parent VM templates 310. In some embodiments, the new parent VM template is created only if additional requests are expected for such VMs. For example, if the request for a particular VM is a one-off request, the new parent VM template is not created.

VM instantiation operations 406 are performed on VMs 235 stored in one or more datastores 408. Exemplary VM instantiation operations 406 include, but are not limited to, cloning, copying, forking, and the like. VM instantiation operations 406 may be performed by virtualization products such as VMware's ESX brand software (e.g., in a kernel layer). In some embodiments, VM instantiation operations 406 implement fast-suspend-resume technology with COW page references (e.g., rather than handing over pages entirely). While described in some embodiments herein with reference to VM forking routines, those of ordinary skill in the art will note that the disclosure is not limited to these VM forking routines. Rather, the disclosure is operable with any fast VM instantiation routines.

Figure 5:
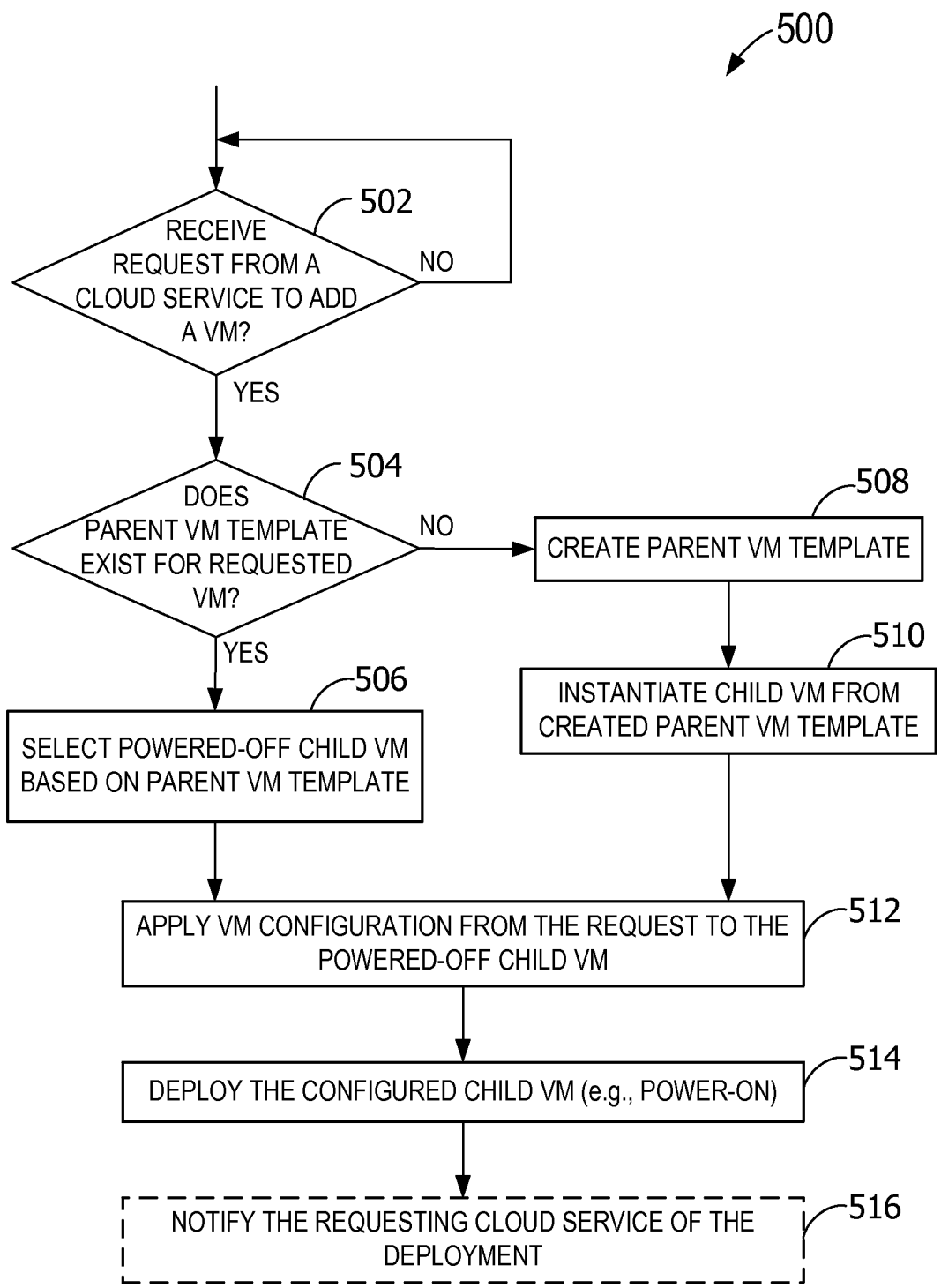
FIG. 5 is a flowchart of an exemplary method performed by a compute fabric cloud service to configure and deploy a child VM in response to a request from a cloud service.

Referring next to FIG. 5, a flowchart illustrates configuration and deployment of one or more child VMs in response to a request from cloud service 302. While method 500 is executed by compute fabric cloud service 402 (shown in FIG. 4) in some embodiments, it is contemplated that method 500 may be performed by any computing device. As such, method 500 is next described as being performed by computing device 304 (shown in FIG. 3).

Computing device 304 creates and maintains a hierarchy of parent VM templates 310 and child VMs, in some embodiments. For example, computing device 304 maintains a set of powered-on parent VM templates 310 and a set of powered-off child VMs 312. Parent VM templates 310 are created, in some embodiments, in response to a request from at least one of cloud services 302. Alternatively or in addition, parent VM templates 310 are created on demand by computing device 304 after detecting patterns in VM 235 provisioning requests from cloud services 302. Maintaining the set of parent VM templates 310 includes, for example, powering-on each of parent VM templates 310. Each child VM is instantiated from one of parent VM templates 310 in response to a request for the child VM. Maintaining the set of child VMs includes, for example, pre-registering each instantiated child VM to the cloud operating system (e.g., before being initiated or otherwise powered-on).

Alternatively or in addition, one or more of cloud services 302 may create and maintain one or more of parent VM templates 310.

At 502, computing device 304 determines whether a request has been received, from one of cloud services 302, for at least one of the child VMs. The request includes a desired child VM configuration, such as child VM properties and/or child VM identity data. The child VM configuration includes, but is not limited to, values describing the properties and/or characteristics of the requested child VM.

Upon receiving a request for one of the child VMs, computing device 304 determines at 504 whether parent VM template 310 exists for the requested child VM. For example, computing device 304 traverses a tree hierarchy of parent VM templates 310 searching for parent VM template 310 associated with the requested child VM. If parent VM template 310 associated with the requested child VM exists in the set of parent VM templates 310, computing device 304 selects one of the child VMs already instantiated from parent VM template 310 at 506. If no parent VM template 310 associated with the requested child VM exists (e.g., the request is for parent VM template 310 that is not in the hierarchy), computing device 304 dynamically creates a new parent VM template at 508, or otherwise in response to the received request. Computing device 304 then instantiates the child VM from the newly-created parent VM template 310 at 510.

At 512, computing device 304 applies the child VM configuration received via the received request to either the selected child VM or the newly-instantiated child, depending on whether parent VM template 310 associated with the requested child VM exists. Applying the child VM configuration includes, but is not limited to, customizing the selected child VM based on the child VM configuration so that the selected child VM has the child VM properties specified in the child VM configuration. For example, applying the child VM configuration includes applying child VM identity data to the selected child VM.

At 514, computing device 304 deploys the configured child VM. For example, computing device 304 initiates or otherwise powers-on the configured child VM. In embodiments in which the child VM was pre-registered to the cloud operating system, deploying the configured child VM occurs without registering, in response to the received request, child VM with the cloud operating system.

At 516, computing device 304 optionally notifies requesting cloud service 302 of the deployment and availability of the configured child VM to accept processing.

In some embodiments, the request to add the child VM actually includes a request to add a plurality of the child VMs. In such embodiments, operations 504, 506, 508, 510, 512, 514, and 516 are performed for each of the plurality of child VMs.

The operations illustrated and described with reference to FIG. 5 may be embodied as computer-executable instructions stored on one or more computer-readable media. The instructions, when executed by processor 306, dynamically scale cloud service 302 by increasing a quantity of VMs 235 available thereto.

After deployment of the configured child VM, cloud service 302 may send commands to destroy the configured child VM. For example, as demand scales back, cloud service 302 sends commands to reduce the quantity of deployed VMs 235. As demand subsequently increase, cloud service 302 may send commands to again increase the quantity of deployed VMs 235. In such embodiments, compute fabric cloud service 402 receives a request from cloud service 302 to re-create the destroyed child VM. Compute fabric cloud service 402 re-performs the operations illustrated in FIG. 5 to detect the request, re-configure the child VM, and re-deploy the child VM.

Figure 6:
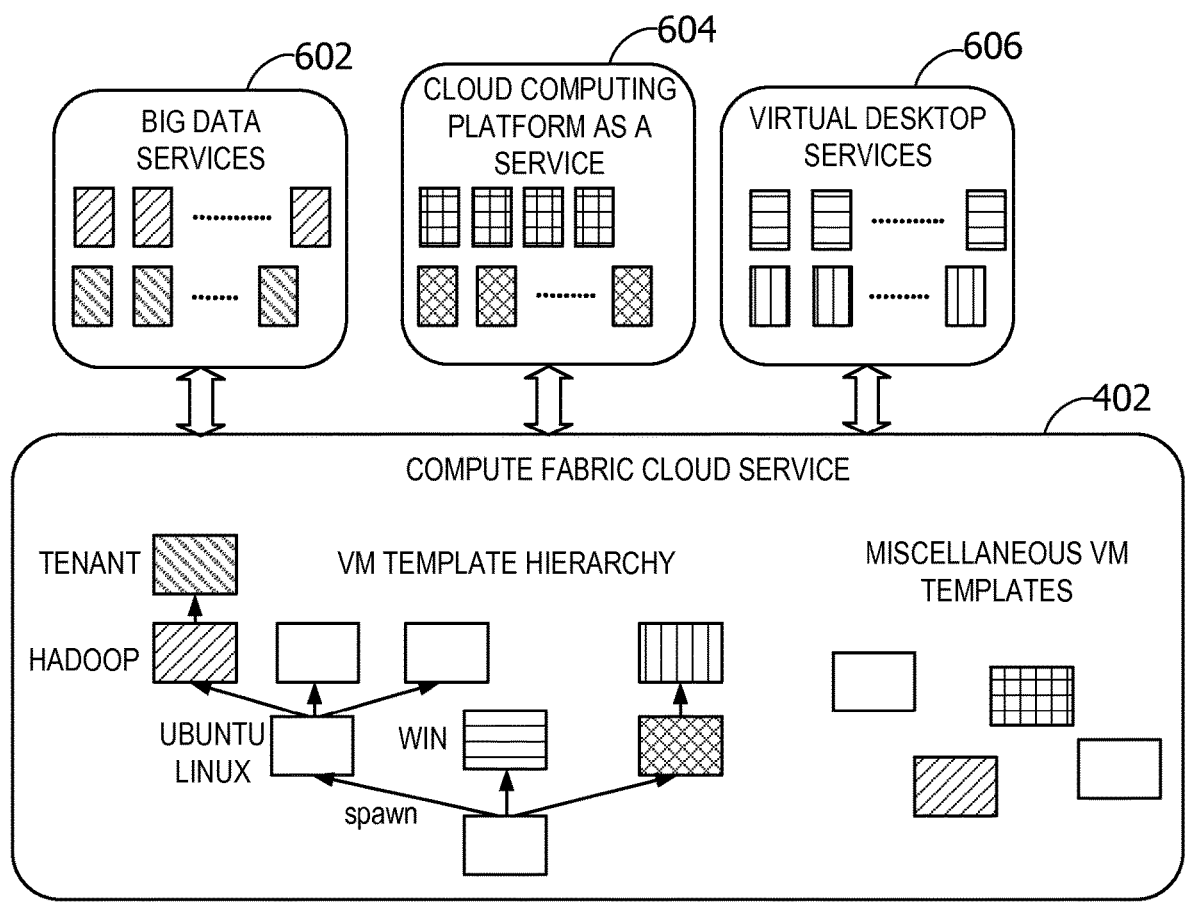
FIG. 6 is a block diagram of an exemplary compute fabric cloud service storing a hierarchy of parent VM templates.

Referring next to FIG. 6, a block diagram illustrates compute fabric cloud service 402 storing a hierarchy of parent VM templates 310. While illustrated with reference to particular cloud services 302, aspects of the disclosure are operable with any cloud service 302. In the example of FIG. 6, cloud services 302 include big data services 602 (e.g., data mining), cloud computing platform as a service (PaaS) 604 (e.g., CLOUD FOUNDRY brand software), and virtual desktop services 606 (e.g., virtual desktop infrastructure). Cloud services 302 communicate with, and share, compute fabric cloud service 402. Communication occurs via API 404 (as shown in FIG. 4) to quickly instantiate and destroy VMs 235 on demand.

Compute fabric cloud service 402 stores, in the example of FIG. 6, parent VM templates 310 in a tree hierarchy. As described with reference to FIG. 5, in response to receiving a request from cloud service 302 for one or more VMs 235 of a particular parent type, compute fabric cloud service 402 immediately customizes the child VMs with the requested identities (e.g., hostname, IP address, etc.) and provides the customized child VMs to requesting cloud service 302.

Both derived VM templates and standalone VM templates are illustrated in FIG. 6. Each derived VM template is derived from one of parent VM templates 310 and shares common disk blocks and memory pages with parent VM template 310. The standalone VM templates may be used when there is limited sharing. The request from cloud service 302 specifies the type of parent VM template 310 to use. For example, big data services 602 may use templates Hadoop and Tenant for instantiating its VMs 235. In this example, the Tenant VM template is spawned from the Hadoop VM template, such as with tenant-specific customizations. In another example, virtual desktop services 606 may use two derived VM templates from the tree hierarchy. In still another example, cloud computing PaaS 604 may use both a standalone VM template and a derived VM template from the tree hierarchy. While disk reads may be slower in children if many accesses are to a parent or older ancestor, cloud computing PaaS 604 may mitigate the effect of such slow reads by keeping only heavily shared packages in parent VM template 310, allowing only a few levels in the template hierarchy, and/or using standalone VM templates.

Figure 7:
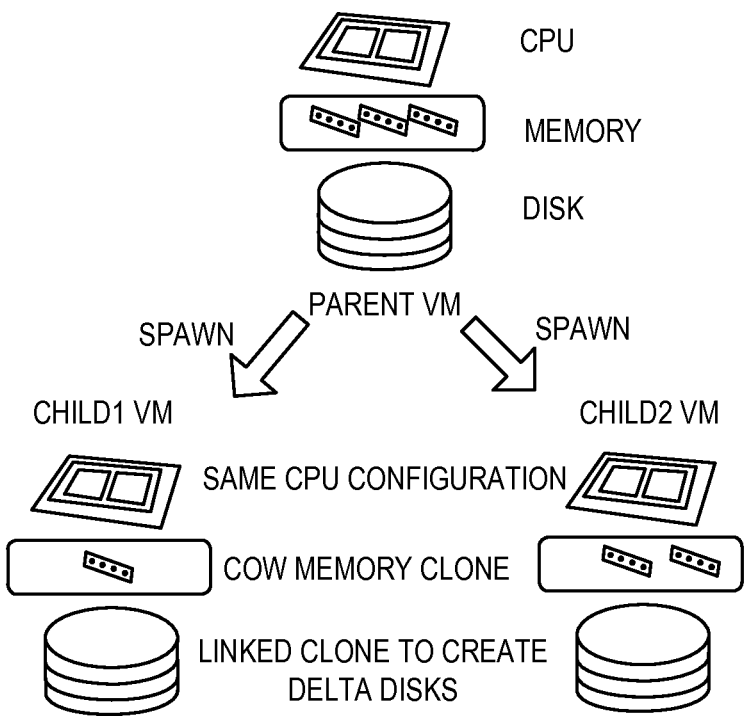
FIG. 7 is a block diagram illustrating instantiation of child VMs from a parent VM.

Referring next to FIG. 7, a block diagram illustrates instantiation of the child VMs (e.g., child1 VM and child2 VM) from parent VM template 310. As described herein, the child VMs may be instantiated in accordance with any fast instantiation routines. In some embodiments, instantiation occurs via routines that fork a running VM. Through forking, compute fabric cloud service 402 avoids boot storm by instead consuming resources to power-on a base VM image once and then instantly forking off copies of the pre-booted VM. In this manner, compute fabric cloud service 402 eliminates the need for hot-spare VMs 235, or otherwise operates without any hot spares, in some embodiments. Further, forked VMs 235 share common memory and disk state, thus eliminating the need to store or de-duplicate redundant copies of disk or memory content across common VMs 235.

In an exemplary forking routine, one of VMs 235 is quiesced (thus becoming powered-on parent VM template 310), and then a defined quantity of the child VMs may be created using the memory, disk, and device state image of this parent VM template 310. Such a forking routing may be organized into three stages: preparing a parent VM, preparing the child VM, and spawning the child VM.

To prepare a parent VM (e.g., a target VM), the parent VM is first powered-on and brought into a state from which the child VMs are desired to begin execution. For example, preparing includes bringing down network interfaces in the parent VM in preparation for an in-guest identity change. When the parent VM is ready to be forked, user 108 or script issues a command via a guest remote procedure call (RPC) to hypervisor 210 requesting the forking. The fork request, in some embodiments, is a synchronous RPC that returns only after the fork process has succeeded. Hypervisor 210 handles the guest RPC by quiescing the parent VM, halting its execution state, and marking all of the memory pages in the parent VM as copy-on-write (COW). The memory and disk state of the parent VM are then ready for use by the child VMs. From the perspective of the parent VM, upon issuing the guest RPC, the parent VM is quiesced forevermore, never to run another instruction.

To prepare the child VM, the child VM is configured to leverage the existing memory, device, and disk state of the parent VM. To share the disk of the parent VM, the child VM is configured with a redo log pointing to the disk of the parent VM as the base disk of the child VM (e.g., similar to a linked clone VM). In addition, the child VM may be configured with its own dedicated storage that is not related to the parent VM. For example, the dedicated storage may include a data disk or access to shared storage if the child VM desires to persist state in storage other than its redo log.

A configuration file (e.g., .vmx file) associated with the child VM is updated to indicate that the child VM inherits the memory and device state of the parent VM upon power-on. The configuration file may also be updated with additional information, such as a desired MAC address and IP address for the child VM. The configuration file is registered with the cloud operating system (e.g., executing on a host), and the child VM is ready to be powered-on on demand.

In some embodiments, the redo log of the child VM is marked as non-persistent. In such embodiments, upon each power-on, the child VM inherits a fresh copy of the memory, device, and disk state of the parent VM (e.g., re-forks from the quiesced image of the parent VM). In other embodiments, the redo log of the child VM is marked as persistent.

Figure 8:
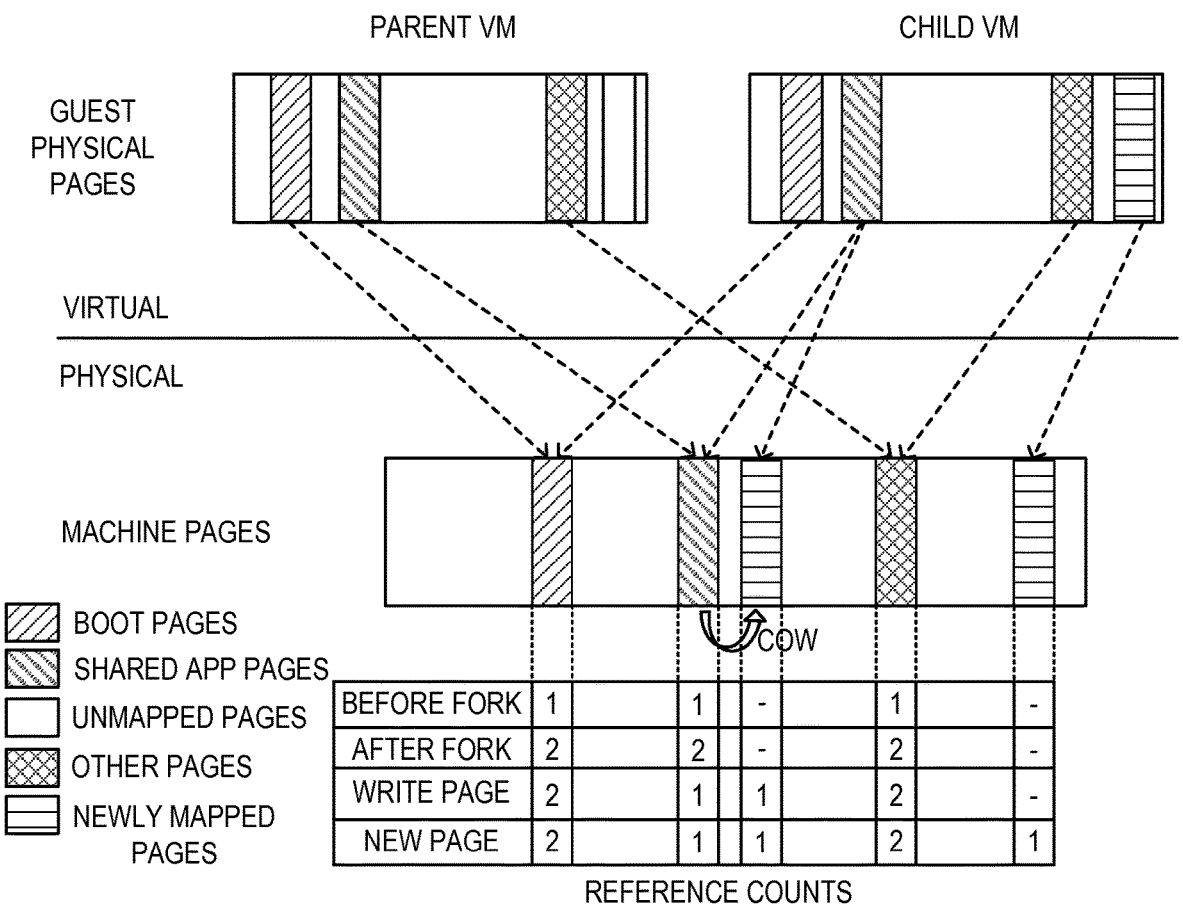
FIG. 8 is a block diagram illustrating shared memory between a parent VM and a child VM.

After preparation, the child VM is ready to be powered-on (e.g., spawned) upon receipt of a power-on request (e.g., from cloud service 302 or from compute fabric cloud service 402). In response to receipt of such a power-on request, the child VM inherits the memory and device state of parent VM template 310. As such, rather than performing a normal boot process, such as through the basic input output system (BIOS), the child VM instead resumes from the state of parent VM template 310. For example, the child VM inherits a COW reference to the memory state of parent VM template 310, such as shown in FIG. 8. Referencing COW memory on the same host eliminates overhead for unmapped pages and results in a small overhead for mapped pages (e.g., less than one microsecond for four kilobyte pages), thus providing fast child VM instantiation. FIG. 8 also illustrates the reference counts for each of the example pages shown in the figure before and after forking, when writing a page, and when creating a new page.

Further, by referencing COW memory, the child VM is able to begin execution in a fraction of a second from the precise instruction (e.g., fork guest RPC) at which parent VM (from which parent VM template 310 was created) was quiesced. From the perspective of the child VM, the child VM sees the fork guest RPC returning successfully from hypervisor 210. The child VM may then be migrated away from parent VM template 310 without need for one-to-many migrations (e.g., one-to-many vMotion operations).

Compute fabric cloud service 402 handles return of the fork guest RPC by customizing the child VM. Customizing the child VM includes, for example, reading and applying a desired configuration state from the configuration file specified when preparing the child VM. Applying the desired configuration state gives the child VM a new identity on the fork path. As described herein, some embodiments customize the child VM by identifying and applying a MAC address, IP address, hostname, and other state to the child VM. Leveraging the customization data, the child VM may then spoof its MAC address to the desired MAC address, update its hostname, IP address, etc., and bring up its network interface. The child VM then continues execution as a unique VM (e.g., separate from parent VM) with its own identity.

Figure 9:
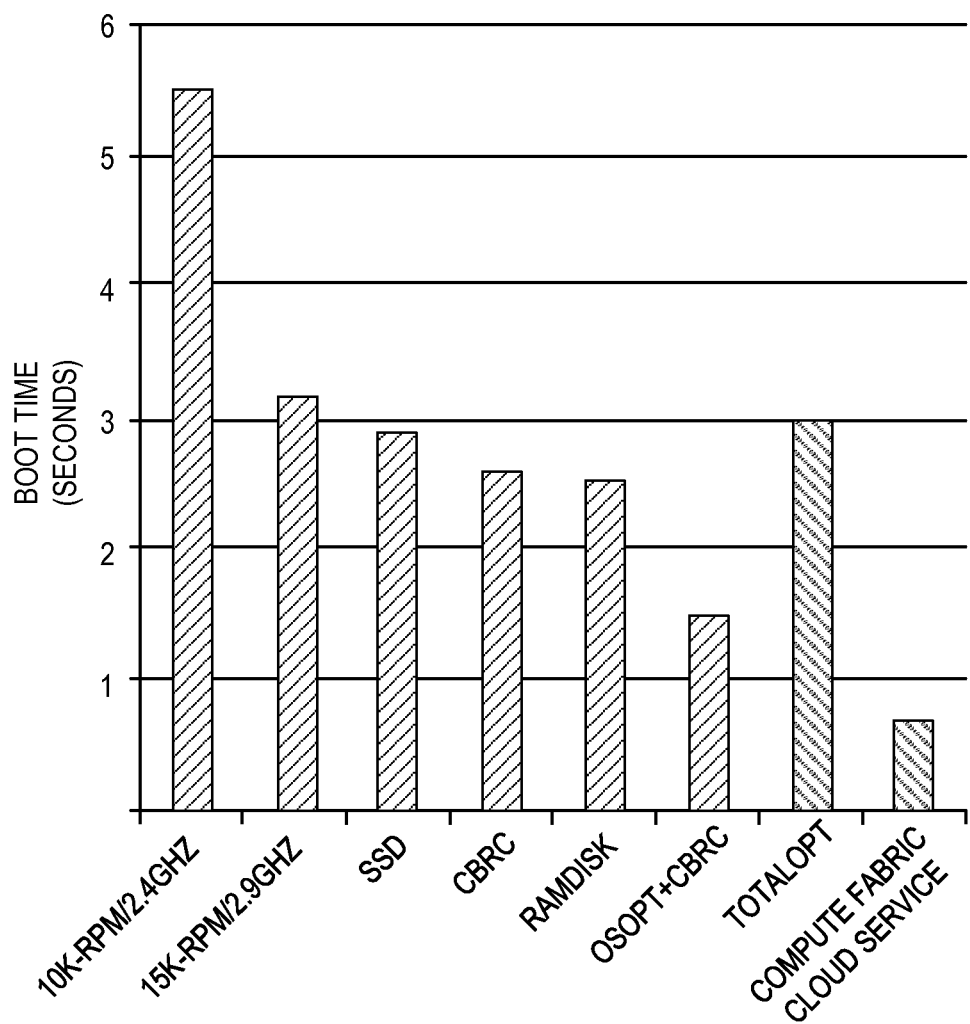
FIG. 9 is a block diagram illustrating boot-time performance of the compute fabric shared service as described herein versus other methodologies.

Referring next to FIG. 9, a block diagram illustrates boot-time performance of compute fabric shared service as described herein versus other methodologies. The data shown in FIG. 9 reflects the boot times for booting VMs 235 customized with various optimizations. In particular, the experiments were run on a 12-core server having a 2.93 GHz Intel Xeon processor and 80 GB of memory. The virtualization software for the experiments includes ESX from VMware, Inc. executing forking routines to implement VM instantiation operations 406.

VMs 235 were optimized in different ways for the purposes of the experiment. Some of the optimizations include using a content based read cache (CBRC) to store the boot image in memory, removing extraneous services and devices from the boot process, grub optimizations, etc. The CBRC is enabled to cache VM disk state and short-circuit read input/output. Other optimizations include leveraging faster disks such as solid-state disks (SSDs) to speed up VM boot times, and moving the entire disk of VM into a random access memory (RAM) disk to avoid disk input/output entirely. The optimizations reduced the total boot and power-on time from about 30 seconds to under three seconds.

The first six entries shown in FIG. 9 strictly capture the time required to completely boot VM from the guest kernel perspective. The final two entries (e.g., TotalOpt and compute fabric cloud service 402) show the total end-to-end time to boot the same VM, determined by comparing the first timestamp in a log of VM to the timestamp of a log issued by the guest via guest RPC at the conclusion of the operating system boot process. The TotalOpt column reflects an observed time of about 2.9 seconds given a heavily optimized guest booting with pre-warmed CBRC. Compute fabric cloud service 402, implementing operations as described herein, booted the same VM in about 0.7 seconds. Compute fabric cloud service 402 saves time not only in VM boot wall clock time, but also in host processor cycle consumption compared to the cost of running through the boot process of VM.

Figure 10:
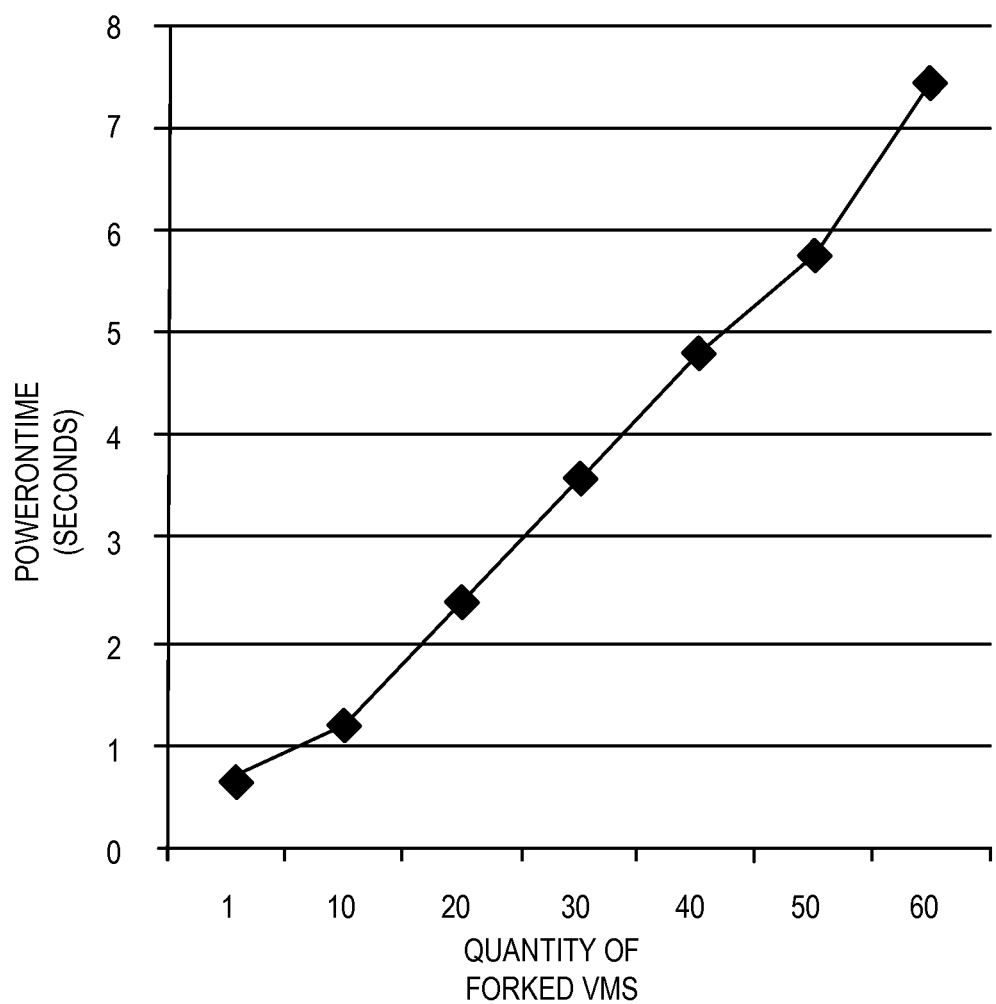
FIG. 10 is a block diagram illustrating power-on time relative to an increasing quantity of forked VMs.

Referring next to FIG. 10, a block diagram illustrates power-on time relative to an increasing quantity of forked VMs 235. In general, child VM power-on time is shown to scale superlinearly. As illustrated in FIG. 10, 60 child VMs were powered-on in about 7.5 seconds, as measured from a power-on request from the first VM to the final child VM reporting via guest RPC that the final child VM was ready to begin executing its workload.

Additional Examples

The following scenarios are merely exemplary and not intended to be limiting in any way.

In an example scenario involving big data services 602, many VMs 235 process different segments of data in parallel. Because these workloads execute along with other potentially time-critical workloads, to make efficient use of resources, the active quantity of VMs 235 must be expanded and reduced, quickly, over time and on demand. Because the creation of VMs 235 is expensive (e.g., in both latency and processor overhead), some existing systems power-on many VMs 235 in the background as hot spares, which wastes processor and memory resources. In contrast, aspects of the disclosure enable compute VMs 235 to be instantly provisioned for maximum performance and constantly recycled for better multi-tenancy. For example, to support Hadoop, 10s to 100s of compute VMs 235 are created to execute Map and Reduce tasks in parallel on data in the Hadoop file system. When Hadoop operates in scavenger mode, additional compute VMs 235 are created to run Hadoop jobs (e.g., low priority, batch jobs) as resources become available. By instantly provisioning and destroying the Hadoop compute VMs 235, embodiments of the disclosure reduce the need to have hot spares and significantly improve Hadoop performance, as described next with reference to an example workload shown in FIG. 11.

Figure 11:
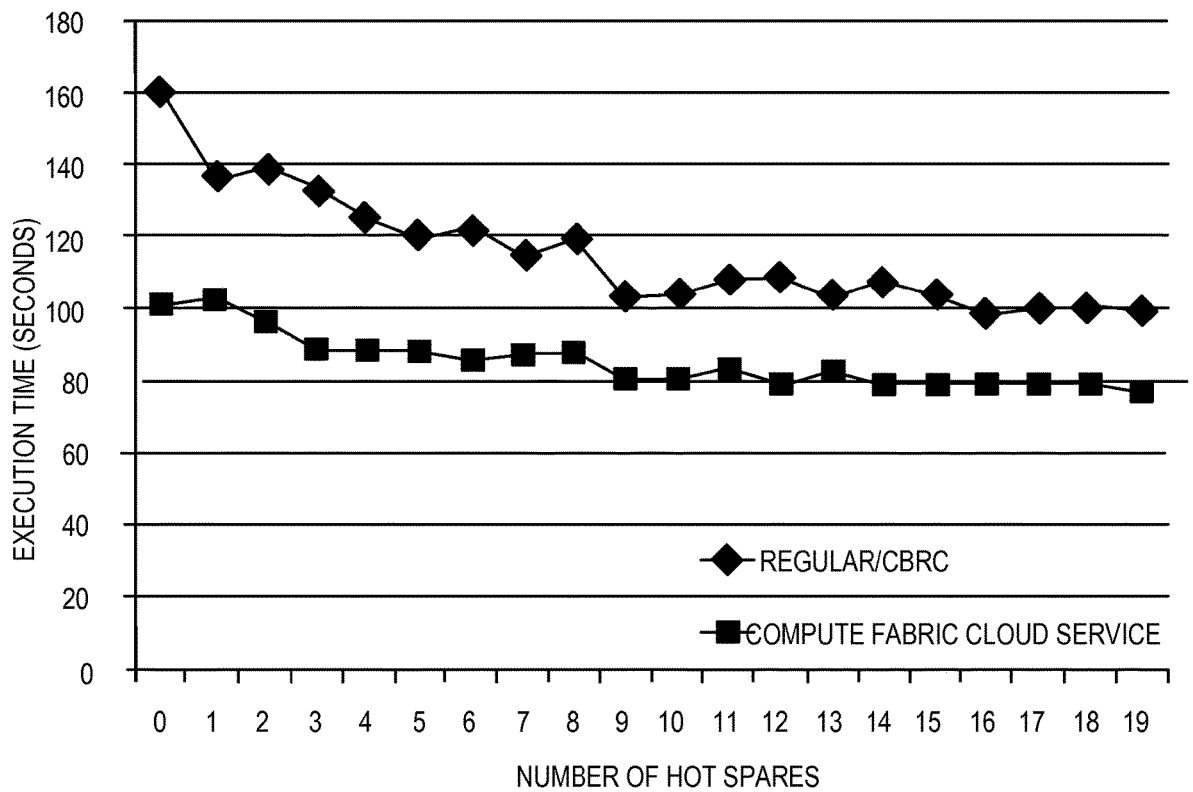
FIG. 11 is a block diagram illustrating execution time relative to an increasing quantity of hot spares.

Referring next to FIG. 11, a block diagram illustrates execution time relative to an increasing quantity of hot spares. As shown in FIG. 11, compute fabric cloud service 402 not only reduces the need to keep many hot spares, compute fabric cloud service 402 also helps to reduce the execution time of compute intensive Hadoop jobs such as pi.

In FIG. 11, the pi workload of Hadoop is executed in two different settings. One setting is for VMs that are heavily optimized for boot time, another setting uses ephemeral VMs created by forking from an Ubuntu Linux parent VM template 310. To obtain the data in FIG. 11, pi was executed with a million sample points, which roughly translates into each task being five seconds long. After every task execution, the compute VM was reset before using the compute VM for the next task. Execution time of the pi job (e.g., 80 map tasks performed as 10 waves of 8 tasks) was measured with an increasing quantity of hot spare VMs.

The results show that using compute fabric cloud service 402 without any hot spares achieves almost the same execution time as the best case execution with regular VMs using at least nine active spares. Moreover, if compute fabric cloud service 402 uses just a couple of hot spares to hide the initial latency, a performance benefit is achieved over the baseline approach. Further, performance of compute fabric cloud service 402 is much better than regular hot spares even with a large number of them.

Figure 12:
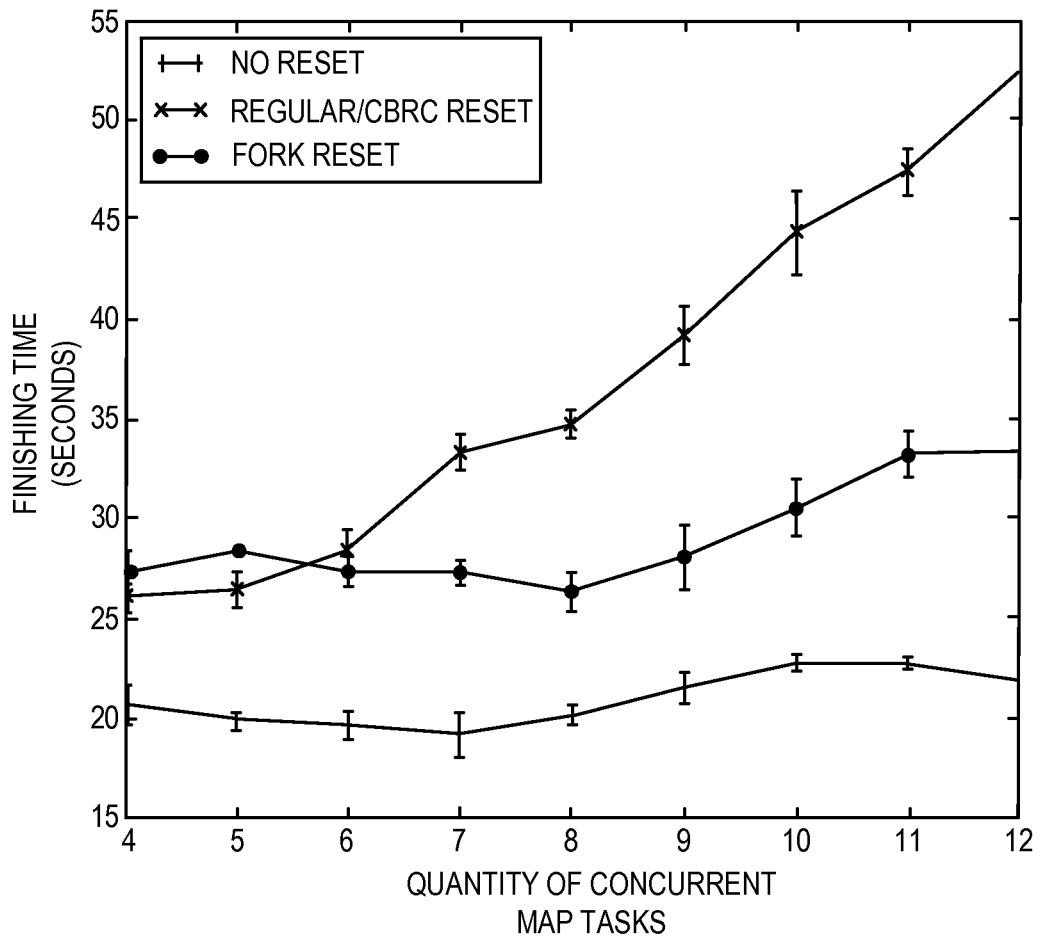
FIG. 12 is a block diagram illustrating finishing time relative to an increasing quantity of concurrent map tasks.

Referring next to FIG. 12, a block diagram illustrates finishing time relative to an increasing quantity of concurrent map tasks. The figure captures the effect of processor overhead of traditional power-ons versus using forked VMs. To generate the data shown in FIG. 12, execution time of a pi workload (from FIG. 11) is measured as a quantity of concurrent maps is increased for three different setups: a) VMs that are not reset after every task, b) VMs that are reset after every task and use traditional VMs (e.g., non-forked VMs), and c) VMs that are reset after every task and use forked VMs.

Setup (a) is used as a baseline to measure the overhead of the other setups. Reset of non-forked VMs (e.g., setup (b)) is shown to interfere significantly with the execution of pi as the quantity of concurrent maps increases. The interference is much smaller when using forked VMs (e.g., setup (c)). In particular, the overhead for setup (b) is almost 100% over setup (c) when twelve concurrent VMs are executed. Setup (c), by itself, has a 25% overhead compared to the setup (a) with no resets.

As the degree of concurrency increases, both setup (a) and setup (c) show almost no overhead until twelve concurrent maps are run, due to use of a 12-core machine that can handle up to twelve concurrent maps in parallel. Beyond this, the processor is overcommitted, which causes execution time to increase. However, even in the overcommitted case, setup (c) scale much better compared to setup (a) and setup (b).

In an example scenario involving virtual desktop services 606, end users login remotely to VMs on a shared infrastructure and use those machines for day-to-day office work. The end users may have either a persistent VM, which is generally suspended to disk upon user session termination, or a non-persistent VM, where the end user is given a fresh VM for each new session. Virtual desktop services 606 greatly benefits from compute fabric cloud service 402 by leveraging the ability to store VM images as parent VM templates 310.

In this scenario, upon a user login request for a non-persistent VM, the child VM is forked, as described herein, from an appropriate parent VM template 310 thus allowing the login to be serviced immediately from an instantaneously provisioned child VM. Compute fabric cloud service 402 may also be able to assist in the persistent VM scenario where a delta of a session of the end user may be persisted as a set of changes (e.g., registry key deltas, user directory changes, etc.) that may be applied to a fresh child VM after forking from parent VM template 310 (e.g., just prior to allowing the end user to log in). In both the persistent VM and non-persistent VM examples, the automatic memory sharing between parent VM templates 310 and forked child VMs as described herein is beneficial.

In an example scenario involving cloud computing PaaS 604 or other cloud service provider, a large quantity of hot spares are required, with some existing systems, to support Postgres service VMs, MySQL service VMs, and the like. Not only do the hot spares waste resources and add greatly to the cost of the cloud service provider infrastructure, the hot spares are difficult to manage at least because the size of the hot spare pool for each service must be tuned based on workload demand prediction.

In contrast, with compute fabric cloud service 402, the VMs common to the services become parent VM templates 310 with instances forked off dynamically as child VMs ready to instantly handle work as needed. Compute fabric cloud service 402 automatically shares the underlying common memory pages and completely eliminates the need for spare VM pools, thus saving administrators from having to attempt prediction of workload demand. Compute fabric cloud service 402 reduces the need to maintain hot spares, enables fast upgrades by patching just parent VM templates 310 and instantly forking, and enables the same framework for provisioning VMs in different operating systems.

In some embodiments, an identity for the child VM is selected from a pool of identities configured prior to the forking process. After or during forking of the child VM, the child VM executes to request one of the pre-configured identities from the cloud operating system (e.g., hypervisor 210). For example, as soon as the child VM begins executing guest instructions, an agent executing in the child VM synchronously requests one of the identities. The agent uses the requested identity to perform an "offline domain join" (e.g., or any method that allows a computer system to join a domain without a reboot), or otherwise update an identity of the child VM in place, before completing the normal boot process (e.g., allowing user 108 to start running arbitrary processes). The agent acts as a blocking agent to prevent the boot process from completing until the child VM has been completely customized.

Exemplary Operating Environment

The operations described herein may be performed by a computer, such as computing device 304. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for maintaining or otherwise managing parent VM templates 310 and the child VMs. For example, the means include means for receiving a request from one of cloud services 302 for at least one child VM, means for customizing the child VM based on the child VM properties from the received request; and means for powering-on the customized child VM.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system, comprising:
    a hypervisor communicating with a plurality of virtual machines (VMs);
    a shared compute fabric cloud service communicating with the hypervisor and a plurality of cloud services;
    a memory associated with the shared compute fabric cloud service;

storage including a plurality of powered-off child VMs; and a processor associated with the shared compute fabric cloud service, the processor programmed to:
create a plurality of powered-on parent VM templates, the plurality of powered-on parent VM templates associated with the hypervisor quiescing at least one of the plurality of virtual machines (VMs) in response to a remote procedure call;
store the plurality of powered-on parent VM templates in the memory;
create a hierarchy that comprises the plurality of powered-on parent VM templates and the plurality of powered-off child VMs, each powered-on parent VM template and each powered-off child VM being assigned to a level in the hierarchy, and each VM of a lower level in the hierarchy sharing at least one storage block of a virtual disk image with a VM in a higher level in the hierarchy;
receive a request from one of the plurality of cloud services for a child VM from the plurality of powered-off child VMs, the request including child VM properties, wherein the child VM properties include at least one of: an ephemeral state, or a boot state;
in response to the received request, determine that a powered-on parent VM template of the plurality of powered-on parent VM templates is associated with the requested child VM;
select a child VM of the plurality of powered-off child VMs that has been already instantiated from the determined powered-on parent VM template;
customize the selected child VM based on the child VM properties in the received request; and
fork the selected, customized child VM from the determined powered-on parent VM template, the forked, customized child VM inheriting a state of the determined powered-on parent VM template.

2. The system of claim 1, wherein the memory stores the plurality of powered-on parent VM templates as a tree hierarchy, and wherein each of the plurality of powered-off child VMs is pre-registered to a hypervisor associated with the shared compute fabric cloud service.

3. The system of claim 1, wherein the child VM properties further include at least one of: hostname, Internet Protocol (IP) address, media access control (MAC) address, processor size, or memory size.

4. The system of claim 1, wherein the processor is programmed to customize the selected child VM by configuring the selected child VM to have the child VM properties from the received request.

5. The system of claim 1, wherein the plurality of powered-on parent VM templates comprise derived VM templates and standalone VM templates, each of the derived VM templates sharing one or more disk blocks with a corresponding one of the plurality of parent VM templates.

6. The system of claim 5, wherein the standalone VM templates lack any disk block inherited from the corresponding one of the plurality of powered-on parent VM templates.

7. The system of claim 1, wherein the processor is further programmed to customize the selected child VM without any hot spare VMs being stored.

8. The system of claim 1, wherein inheriting a state of the determined powered-on parent VM template comprises inheriting a copy-on-write (COW) reference to a memory state of the determined powered-on parent VM template.

9. A method, comprising:
creating, by a computing device, a set of powered-on parent VM templates, the set of powered-on parent VM templates associated with a hypervisor quiescing at least one of a plurality of virtual machines (VMs) in response to a remote procedure call;
maintaining, by the computing device, a set of powered-off child VMs, each powered-off child VM in the set of powered-off child VMs sharing storage of a parent VM template from the set of powered-on parent VM templates upon instantiation from an associated one of the powered-on parent VM templates;
receiving a request from a cloud service for at least one child VM from the set of powered-off child VMs, the request including child VM properties and identifying a child VM configuration, wherein the child VM properties include at least one of an ephemeral state, or a boot state;
in response to the received request, determining that a powered-on parent VM template of the set of powered-on parent VM templates is associated with the requested at least one child VM;
selecting a child VM of the set of powered-on child VMs that has been already instantiated from the determined powered-on parent VM template;
customizing, by the computing device in response to the received request, the selected child VM configuration based on the identified child VM configuration; and
forking the selected, customized at least one child VM, the forked customized child VM inheriting a state of the determined powered-on parent VM template.

10. The method of claim 9, wherein forking the selected, customized at least one child VM occurs without registering, in response to the received request, the at least one child VM with the hypervisor.

11. The method of claim 9, further comprising notifying the cloud service of the selected, customized powered-on at least one child VM.

12. The method of claim 9, wherein inheriting a state of the determined powered-on parent VM template comprises inheriting a copy-on-write (COW) reference to a memory state of the determined powered-on parent VM template.

13. The method of claim 9, wherein maintaining the set of powered-on parent VM templates comprises pre-registering the set of powered-off child VMs with the hypervisor.

14. The method of claim 9, wherein maintaining the set of powered-on parent VM templates comprises creating at least one of the parent VM templates in response to receiving a request from the cloud service to create said at least one of the parent VM templates.

15. The method of claim 9, wherein maintaining the set of powered-on parent VM templates comprises automatically creating at least one of the parent VM templates in response to receiving a plurality of requests for a same type of child VM.

16. One or more computer-readable storage media including computer-executable instructions for dynamically scaling a cloud service by increasing a quantity of virtual machines (VMs) available thereto, wherein the computer-executable instructions, when executed by at least one processor, cause the at least one processor to at least:
create a plurality of powered-on parent VM templates, the plurality of powered-on parent VM templates associated with a hypervisor quiescing at least one of a plurality of virtual machines (VMs) in response to a remote procedure call;
create a hierarchy that comprises the plurality of powered-on parent VM templates and powered-off child VMs, each powered-on parent VM template and each powered-off child VM being assigned to a level in the hierarchy, and each VM of a lower level in the hierarchy sharing at least one storage block of a virtual disk image with VM in a higher level in the hierarchy;

receive a request from the cloud service for at least one of the powered-off child VMs from the created hierarchy, the request including child VM properties and child VM identity data, wherein the child VM properties include at least one of: an ephemeral state, or a boot state;

in response to the received request, determine that a powered-on parent VM template from the hierarchy of powered-on parent VM templates is associated with the requested at least one of the powered-off child VMs;

select a child VM from the hierarchy of powered-off child VMs that has been already instantiated from the determined powered-on parent VM template;

customize the selected child VM from the powered-off child VMs based on the child VM identity data; and fork the selected, customized child VM, the forked customized child VM inheriting a state of the determined powered-on parent VM template.

17. The computer storage media of claim 16, wherein the computer-executable instructions further cause the at least one processor to at least:

receive a request from the cloud service for a parent VM template not in the hierarchy; and dynamically create the requested parent VM template.

18. The computer storage media of claim 16, wherein the computer-executable instructions further cause the at least one processor to at least:

receive a request from the cloud service to destroy the selected, customized powered-on child VM; and in response to the received request, destroy the selected, customized powered-on child VM.

19. The computer storage media of claim 18, wherein the computer-executable instructions further cause the at least one processor to at least:

receive a request from the cloud service to re-create the destroyed child VM; and re-create the destroyed child VM by re-performing said customizing and said forking.

20. The computer storage media of claim 16, wherein the computer-executable instructions that cause the at least one processor to cause the customized child VM to inherit the state of the determined powered-on parent VM template further cause the at least one processor to at least assign a pointer for a first memory region of the customized child VM to point to a second memory region of the determined powered-on parent VM template.

* * * * *